US011070367B2

(12) United States Patent
Bhattacharya et al.

(10) Patent No.: US 11,070,367 B2
(45) Date of Patent: Jul. 20, 2021

(54) KEY EXCHANGE DEVICES AND METHODS (71) Applicant: KONINKLIJKE PHILIPS N.V., Eindhoven (NL)

(72) Inventors: Sauvik Bhattacharya, Eindhoven (NL); Oscar Garcia Morchon, Eindhoven (NL); Ludovicus Marinus Gerardus Maria Tolhuizen, Waalre (NL); Ronald Rietman, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 162 days.

(21) Appl. No.: 16/485,708

(22) PCT Filed: Feb. 15, 2018

(86) PCT No.: PCT/EP2018/053766
§ 371 (c)(1),
(2) Date: Aug. 13, 2019

(87) PCT Pub. No.: WO2018/149912
PCT Pub. Date: Aug. 23, 2018

(65) Prior Publication Data
US 2019/0386825 A1 Dec. 19, 2019

(30) Foreign Application Priority Data
Feb. 15, 2017 (EP) .................................... 17156214

(51) Int. Cl.
H04L 9/08 (2006.01)

(52) U.S. Cl.
CPC .......... *H04L 9/0841* (2013.01); *H04L 9/0847* (2013.01)

(58) Field of Classification Search
CPC .... H04L 9/0841; H04L 9/0847; H04L 9/0838
See application file for complete search history.

(56) References Cited

U.S. PATENT DOCUMENTS

| 9,246,675 | B2 * | 1/2016 | Ding ..................... H04L 9/0819 |
| 9,948,460 | B2 * | 4/2018 | Cheng ........................ H04L 9/12 |
| 10,110,569 | B1 * | 10/2018 | Coelho ................. H04W 12/02 |
| 10,129,223 | B1 * | 11/2018 | Bhattacharyya ...... H04L 63/061 |

(Continued)

OTHER PUBLICATIONS

Alkim, E. et al., "Post-quantum key exchange—a new hope". USENIX Security 2016.

(Continued)

*Primary Examiner* — Lynn D Feild
*Assistant Examiner* — Viral S Lakhia (57) ABSTRACT A first electronic network node (110) is provided configured for goo a key exchange (KEX) protocol, the first network node is configured to—obtain a shared matrix (A) shared with a second network node, entries in the shared matrix A being selected modulo a first modulus q, generate a private key matrix ($S_I$), entries in the private key matrix being bounded in absolute value by a bound (s) generate a public key matrix ($P_I$) by computing a matrix product between the shared matrix (A) and the private key matrix ($S_I$) modulo the first modulus (q) and scaling the entries in the matrix product down to a second modulus (p).

34 Claims, 4 Drawing Sheets

(56) References Cited

U.S. PATENT DOCUMENTS

| | | | |
|---|---|---|---|
| 10,181,049 B1* | 1/2019 | El Defrawy | G06F 21/6227 |
| 10,263,778 B1* | 4/2019 | Grubin | H04L 67/1095 |
| 10,425,225 B1* | 9/2019 | Grubin | H04L 9/0897 |
| 10,630,682 B1* | 4/2020 | Bhattacharyya | H04L 9/3273 |
| 2012/0023336 A1* | 1/2012 | Natarajan | H04L 9/0841 |
| | | | 713/179 |
| 2014/0185805 A1* | 7/2014 | Andersen | H04L 67/12 |
| | | | 380/270 |
| 2018/0042009 A1* | 2/2018 | Abdel Shahid | H04W 72/121 |

OTHER PUBLICATIONS

Banerjee, A. et al., "Pseudorandom functions and lattices." Cryptology ePrintArchive, Report 2011/401, http://eprint.acr.org/2011/401.

Bos, J. et al., "Take off the ring! Practical, Quantum-Secure Key Exchange from LWE." Cryptology ePrint Archive, Report 2016/1126, http://eprint.iacr.org/2016/1126.

Cheon, J.H. et al., "Lizard: Cut off the Tail! Practical Post-Quantum Public-Key Encryption from LWE and LWR." Cryptology ePrint Archive, Report 2016/659, http://eprint.iacr.org/2016/659.

ETSI GR QSC 007, vo.o.1 (Nov. 2016). "Quantum-Safe Cryptography (QSC); Quantum-safe key exchanges".

International Search Report—PCT/EP2018/053766 dated Feb. 15, 2018.

Peikert, C. "Lattice cryptography for the Internet." Cryptology ePrintArchive, Report 2014/070, http://eprint.iacr.org/2014/070.

* cited by examiner

KEY EXCHANGE DEVICES AND METHODS

CROSS-REFERENCE TO PRIOR APPLICATIONS

This application is the U.S. National Phase application under 35 U.S.C. § 371 of International Application No. PCT/EP2018/053766, filed on Feb. 15, 2018, which claims the benefit of European Patent Application No. 17156214.3, filed on Feb. 15, 2017. These applications are hereby incorporated by reference herein.

FIELD OF THE INVENTION

The invention relates to a network node, a key agreement method and a computer readable medium.

BACKGROUND OF THE INVENTION

In cryptography, a key-agreement protocol is a protocol whereby two or more parties that may not yet share a common key can agree on such a key. Preferably, both parties can influence the outcome so that neither party can force the choice of key. An attacker who eavesdrops on all communication between the two parties should learn nothing about the key. Yet, while the attacker who sees the same communication learns nothing or little, the parties themselves can derive a shared key.

Key agreement protocols are useful, e.g., to secure communication, e.g., to encrypt and/or authenticate messages between the parties.

Practical key agreements protocols were introduced in 1976 when Whitfield Diffie and Martin Hellman introduced the notion of public-key cryptography. They proposed a system for key agreement between two parties which makes use of the apparent difficulty of computing logarithms over a finite field GF(q) with q elements. Using the system, two users can agree on a symmetric key. The symmetric key may then be used for say, encrypted communication between the two parties.

Current key agreement methods applicable when the parties do not yet have a shared secret, such as the Diffie-Hellman key agreement method, require resource-heavy mathematical operations. For example, the Diffie-Hellman requires one to perform exponentiation operations over a finite field. Both the exponent and the field size may be large. This makes key agreement protocols less suitable for low-resource devices. On the other hand, key agreement protocols would be very useful in resource-restrained devices. For example, in application areas such as the internet of things, ad-hoc wireless networks, and the like, key agreement could be used to protect links between devices. Another example is communication between a reader and an electronic tag, say a card reader and a smart card, or a tag reader and tag, e.g., an RFID tag or an NFC tag. It would be advantageous to have a key agreement protocol that places a smaller burden on at least one of the two parties, i.e., on the electronic tag.

In order to facilitate secure communication among parties, key agreement protocols are sometimes further subdivided into cryptographic key-exchange (KEX) and cryptographic key-encapsulation (KEM) schemes. Cryptographic key-encapsulation (KEM) schemes use asymmetric cryptography to establish a shared secret among two parties, using a publicly known (e.g., public-key) and a secretly-owned (e.g., secret-key) value for each party.

KEX schemes involve the exchange of public-keys by each party, that is then independently used by the other party along with their own secret-key to calculate the common shared secret. A well-known example of a KEX scheme is the Diffie-Hellman key-exchange, mentioned above, whose security is based on solving the discrete logarithm problem. An interesting feature of some KEX schemes is that the actual final, shared secret is never exchanged between the parties, not even in encrypted form, but is calculated independently by the two parties at each end. This results in a desirable feature known as forward-secrecy, which ensures that even the compromise of a party's long-term secret-key by an attacker in the future would not compromise the secrecy of encrypted message exchanged in the past.

KEM schemes establish a shared secret between two entities or parties using asymmetric cryptography by one party, usually the initiator of the communication, to encrypt (using the other party's public-key) and transmit a shared secret to the other party, known as the responder, who can then decrypt it (using her secret-key) and then use it for securely communicating with the initiator party. KEM schemes cannot achieve forward-secrecy, since any attacker that compromises a party's secret-key for a past session and has recorded all messages exchanged between the parties in that session can recover the shared secret for that particular session.

Due to increasing security needs in the Internet of Things, key-exchange schemes need to also achieve high efficiency (i.e., minimal amount of communication or bandwidth requirements) while also remaining secure, against classical as well as quantum-capable adversaries.

SUMMARY OF THE INVENTION

An electronic network node configured for a key exchange protocol is provided. The network node will be referred to as the first network node to distinguish it from a second network node with which it communicates.

The first network node comprises
  a communication interface arranged for digital communication with a second network node, and
  a processor circuit configured to
    obtain a shared matrix, the shared matrix being shared with the second network node through the communication interface, entries in the shared matrix A being selected modulo a first modulus q,
    generate a private key matrix, entries in the private key matrix being integer numbers bounded in absolute value by a bound,
    generate a public key matrix by
      computing a matrix product between the shared matrix and the private key matrix modulo the first modulus obtaining a matrix product
      scaling the entries in the matrix product down to a second modulus, a scaled entry being equal to the unsealed entry multiplied with the second modulus, divided by the first modulus and rounded to the nearest integer, the second modulus being smaller than the first modulus, the bound being at most the second modulus,
    sending the public key matrix of the first network node to the second network node,
    receiving a public key matrix of the second network node, computing a raw key as a matrix product between the received public key of the second node and the private key matrix of the first network node modulo the second modulus.

Because the private key matrix is bounded and the public key matrix is scaled down, the computation and communication overhead of the key agreement is reduced. Using reconciliation data the difference between the raw key matrix computed at the first and second network node can be overcome. One of the nodes computes reconciliation data and the other uses it. For example, the processor circuit of the first network node may be configured for receiving reconciliation data of the second network node,
computing a shared key by applying a reconciliation function to the received reconciliation data and the raw key, or the processor circuit of the first network node may be configured for
obtaining the shared key and reconciliation data from the raw key,
sending the reconciliation data to the second network node.

The network nodes are electronic devices. For example, they may be mobile electronic devices, such as a mobile phone, tablet, or a smart-card, computer. The network node may be a set-top box, computer, television, and the like. The method of key agreement described herein may be applied in a wide range of practical applications. Such practical applications include security in the Internet (of Things). Protocols can be applied to protocols such as IKE, TLS, SSH, and others. In general, the proposed scheme is post-quantum secure both for general Internet use-cases and for resource-constrained environments. Key agreement may be used whenever secured, e.g. confidential, communication between two nodes is required. This may be in a sensor network, but also e.g., to secure financial transactions.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a key agreement network,
FIG. 2 schematically shows an example of an embodiment of a raw key,
FIG. 3 schematically shows an example of an embodiment of an electronic key exchange method,
FIG. 4a schematically shows a computer readable medium having a writable part comprising a computer program according to an embodiment,
FIG. 4b schematically shows a representation of a processor system according to an embodiment.

LIST OF REFERENCE NUMERALS IN FIGS. 1-2

100 a key agreement network
110 a network node of initiator type
120 a communication interface
130 a shared matrix unit
140 a private key matrix unit
150 a public key matrix unit
160 a shared key unit
162 a raw key
164 reconciliation data (h)
166 a shared key
210 a network node of responder type
220 a communication interface
230 a shared matrix unit
240 a private key matrix unit
250 a public key matrix unit
260 a shared key unit
262 a raw key
264 reconciliation data (h)
266 a shared key
300 a raw key
301 a most significant part
302 a middle significant part
303 a least significant part

DETAILED DESCRIPTION OF THE EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

Figure 1:
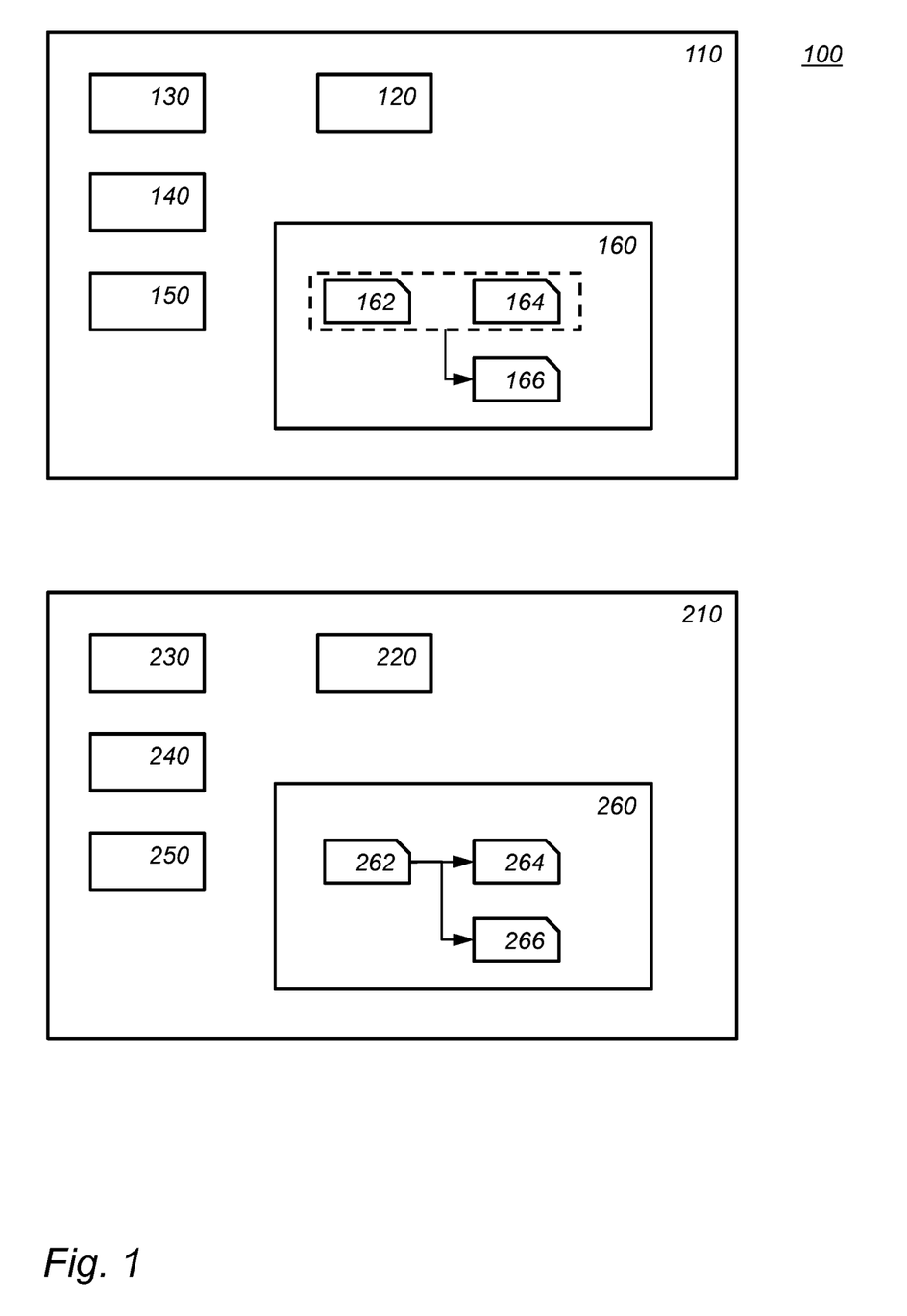

FIG. 1 schematically shows an example of an embodiment of a key agreement network 100.

Shown in FIG. 1 are two network nodes in the system: a network node 110 of initiator type and a network node 210 of responder type. In an embodiment of the key agreement system the number of nodes may be larger, even much larger, than two, e.g., more than a 1000 nodes, e.g. more than 10^6 nodes.

The difference between a network node of initiator or responder type is how it deals with reconciliation data. A network node of initiator type receives reconciliation data and applies it to obtain the shared key, whereas a network node of responder type generates reconciliation data and sends it the network node of initiator type. The responder type network node does not need reconciliation data to obtain the shared key. Typically, an initiator type will also initiate the key agreement protocol between the two network nodes, as this may reduce the number of rounds executed between the two networks node. However, it is not necessary; the key agreement protocol could also be initiated by a network node of responder type.

Furthermore, in an embodiment of the network node, the network node is configured to operate according to an initiator mode and according to a responder mode. For example, if the network node initiates a key agreement, e.g., sends a message to another network node signaling the start of the key agreement protocol, then the network node may switch to initiator mode. If the network node responds to a key agreement, e.g., receives a message from another network node signaling the start of the key agreement protocol, then the network node may switch to responder mode. Although this is convenient in practice, also this option is not strictly necessary; for example, in a key agreement system some modes may only be configured as initiator and some may only be configured as responder nodes. A consequence of this will be that some nodes cannot agree on a shared key together. For some networks this need not be a problem, e.g., in ad-hoc network, or ad-hoc wireless grids, etc., so long as sufficiently many pairs of network nodes can communicate and agree on a shared key.

Initiator node 110 comprises a communication interface 120. Responder node 210 comprises a communication interface 220. The communication interfaces may be arranged for digital communication with the other nodes in the key agreement system. It is not necessary though that all nodes in the system can be reached at all times.

Communication interface 120 and 220 are arranged for digital communication. For example, the communication interfaces may be arranged to communicate over a computer network. For example, the communication interface may be arranged for wireless, e.g., Wi-Fi, ZigBee, Bluetooth and the like, and/or wired communication, e.g., Ethernet, USB, and the like. The communication between nodes 110 and 210 may also be a combination of wired and wireless connections. For example, the nodes in system 100, including nodes 110 and 120 may comprise an electronic storage that contains a communication identifier, which uniquely identifies the node within system 100. For example, the communication identifier may be included in digital messages exchanged between nodes 110 and 210, e.g., to address the message. For example, the communication identifier may an IP address, a MAC address, and the like.

The electronic network node is configured for a key exchange (KEX) protocol. The protocol involves exchanging messages between the nodes 110 and 210 over the communication interfaces 120 and 220, and performing computations on, e.g., data received from the other node. The execution of the key agreement protocol is implemented in a processor circuit, examples of which are shown below. FIG. 1 shows functional units that may be functional units of the processor circuit. For example, FIG. 1 may be used as a blueprint of a possible functional organization of the processor circuit. The processor circuit is not shown separate from the units in FIG. 1. For example, the functional units shown in FIG. 1 may also be wholly or partially be implemented in computer instructions that are stored at the network nodes and are executable by a microprocessor of the network node.

Initiator node 110 and responder node 210 are configured for a key exchange (KEX) protocol. KEX schemes involve the exchange of public-data, often termed public keys, by each party, that is then independently used by the other party along with their private data, often termed a secret-key, to calculate the common shared secret. An interesting feature of some embodiments is that the actual final, shared secret is never exchanged between the parties, not even in encrypted form, but is calculated independently by the two parties at each end. This results in a desirable feature known as forward-secrecy, which ensures that even the compromise of a party's long-term secret-keys by an attacker in the future would not compromise the secrecy of encrypted message exchanged in the past.

Embodiments of the inventions do not rely on a trusted third party to provide confidential communication. The communication channel between communication interfaces 120 and 220 need not necessarily be a secure channel. Attackers may be able to eavesdrop on the communication channel. Even so, the key that is agreed between nodes 110 and 210 may be secure. If the communication channel is protected against alterations, a degree of authentication may be obtained in so far as provided by the channel. However, if the channel between communication interfaces 120 and 220 is not protected against alterations, no KEX scheme will achieve authentication. To obtain authentication, embodiments may be combined with any known authentication mechanism, e.g., an implicit authentication mechanism, e.g., using certified public-keys, or an explicit authentication mechanism, e.g., using digital signatures.

A well-known example of a KEX scheme is the Diffie-Hellman key-exchange, whose security is based on solving the discrete logarithm problem. In the invention, a key-exchange mechanism is defined whose hardness is based on a so-called Learning with Rounding (LWR) problem. The hardness of the LWR problem may be based on the hardness assumption of the so-called Learning with Error (LWE) problem when the number of LWE instances is bounded. Since the average-case hardness of the LWE problem is based on the worst-case hardness of certain related lattice-based problems, which are difficult for a quantum computer to solve, this key-exchange scheme is a post-quantum secure key agreement protocol.

The Learning with Errors (LWE) problem is a mathematically hard problem, giving rise to post-quantum cryptographic schemes due to its presumed difficulty even against quantum computers, and well-understood security. However, schemes arising from it are typically heavyweight in performance, both with respect to computational and communication complexities. The Learning with Errors (LWE) problem can be described as follows:

For an n-dimensional vector $s \in Z_q^n$ and an error distribution $\chi$ over $Z_q$, the LWE distribution $A_{n,q,\chi}^{LWE}(s)$ over $Z_q^n \times Z_q$ is obtained by choosing a vector a uniformly and randomly from $Z_q^n$ and an error e from $\chi$, and outputting (a, b=⟨a, s⟩+e)$\in Z_q^n \times Z_q$.

The search LWE problem is to find $s \in Z_q^n$ given arbitrarily many independent samples $(a_i, b_i)$ from $A_{n,q,\chi}^{LWE}(s)$. The decision LWE problem, denoted by $LWE_{n,q,\chi}(D)$ is to distinguish the distribution $A_{n,q,\chi}^{LWE}(s)$ from the uniform distribution over $Z_q^n \times Z_q$ with non-negligible advantage, for a fixed $s \leftarrow D$.

The LWR problem is a "de-randomized" version of the LWE problem, by using rounding with a modulus "p" instead of inserting errors to hide secret information, and then introducing a deterministic error by scaling down from $Z_q$ (where q is the original LWE modulus) to $Z_p$.

For an n-dimensional vector $s \in Z_q^n$, the LWR distribution $A_{n,q,p}^{LWR}(s)$ over $Z_q^n \times Z_p$ is obtained by choosing a vector a uniformly and randomly from $Z_q^n$, and outputting $$\left(a, \left\lfloor \frac{p}{q} \cdot \langle a, s \rangle_q \right\rfloor\right) \in Z_q^n \times Z_p.$$

Here, $\lfloor x \rceil$ denotes the integer closest to x. The search LWR problem is defined in terms of finding the secret s exactly similar to the search LWE problem. The decision LWR problem is to distinguish the distribution $A_{n,q,p}^{LWR}(s)$ from the uniform distribution over $Z_q^n \times Z_p$ with m instances for a fixed $s \leftarrow D$. It has been shown that the search and decision LWR problems are at least as hard as the corresponding LWE problems when in is bounded such that 2mBp/q is a constant (where B is a bound on the errors in the LWE problem).

Post-quantum key-exchange schemes based on the LWE problem enjoy widespread confidence due to the well-understood security of the LWE problem. However, there is no LWE-based key-exchange scheme that is lightweight in performance, capable of being used in resource-constrained environments. Existing algorithms include various operations that are slow on limited-resource devices, such as: matrix multiplication modulo q, sampling from a probability distribution such as a Gaussian distribution, and computation or transmission of matrices with large entries.

In the invention, the two parties generate two matrices that are approximately, but not exactly equal. To come to exact agreement, some reconciliation data is sent. A scheme for doing so is explained in a patent application of the same applicant, with title "REACHING AGREEMENT ON A SECRET VALUE", filed at the EPO on 4 Nov. 2016, with application Ser. No. 16/197,277.3; for example, the method on pages 7-10 may be used for reconciliation in embodiments according to the invention. Variants disclosed elsewhere in the cited patent application may also be adopted.

In this application, we will use the following notation for the following three functions:

1. Rounding Function $\lfloor \cdot \rceil_{B,b_h}$:

For q, $b_h$, $B \in Z$, $b_h \geq 1$, $B < \log_2 q - b_h$, let $\bar{B} = \log_2 q - B$. Then, $$\lfloor \cdot \rceil_{B,b_h} : v \rightarrow \lfloor 2^{-\bar{B}} \cdot v \rceil (\mod 2^B)$$

Intuitively, $\lfloor v \rceil_{B,b_h}$ extracts the B most significant bits of $\{v + 2^{\log q - (B+b_h)}\}$, where the second component is a rounding factor to ensure unbiased rounding errors.

2. Cross-Rounding Function $\langle \cdot \rangle_{B,b_h}$:

For q, $b_h$, $B \in Z$, $b_h > 1$, $B < \log_2 q - b_h$, let $\bar{B} = \log_2 q - B$. Then, $$\langle \cdot \rangle_{B,b_h} : v \rightarrow \lfloor 2^{-\bar{B}+b_h} \cdot v \rfloor (\mod 2^{b_h})$$

Intuitively, $\lfloor v \rceil_{B,b_h}$ extracts the $b_h$ least significant bits of the $(B+b_h)$ most significant bits of v.

3. Reconciliation Function rec(w,b):

For q, $b_h$, $B \in Z$, $b_h \geq 1$, $B < \log_2 q - b_h$, $w \in Z_q$, $b \in [0, 2^{b_h})$, $$rec(w,b) = \lfloor v \rceil_{B,b_h}$$

where v is the closest element to w such that $\langle v \rangle_{B,b_h} = b$.

Figure 2:
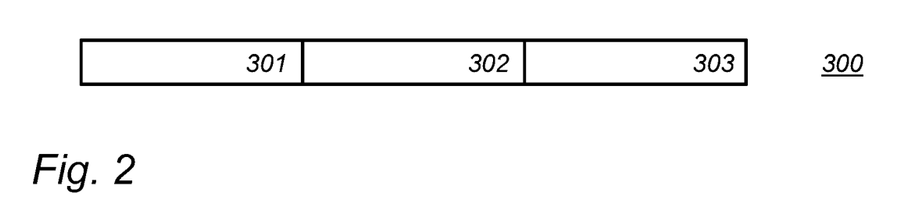

The above cited reconciliation function is used as an example, herein. As noted, the reconciliation methods in the above cited application could also be used. FIG. 2 is a schematic illustration of the rounding and cross rounding functions. As an example, FIG. 2 shows a raw key 300. Raw key 300 is illustrated as a bit string, with the most significant bits to the left and the least significant bits to the right. Intuitively, the rounding function applied to the raw key corresponds to the B bits in most significant part 301, the cross-rounding function to the $b_h$ next bits in middle part 302. The least significant $\log_2 q - B - b_h$ may be discarded.

Initiator node 110 comprises a shared matrix unit 130. Responder node 210 comprises a shared matrix unit 230. The shared matrix units 130 and 230 are configured to obtain a shared matrix (A) that is shared between the two nodes. Entries in the shared matrix A being integer numbers selected modulo a first modulus q. There many ways to ensure that the same matrix is shared between nodes 110 and 210, especially given the fact that the matrix A does not necessarily be kept private to the nodes 110 and 210.

For example, one of the nodes, say the initiator node 110, e.g., in shared matrix unit 130, may select a matrix A, e.g., at random with elements modulo q. The entries may then be sent through the communication units to the other node, e.g., to shared matrix unit 230. In this case, the latter shared matrix unit 230 will simply receive the matrix and store it. Matrix A may also be chosen by responder node 210 instead and sent to the initiator node 110.

The two nodes may also cooperate in choosing the matrix A. For example, each node may select some of the entries, and sent it to the other side. For example, the initiator nodes may select the odd entries, and the responder node the even entries, etc. In this way, none of the two nodes has control over the final matrix A. For example, the two nodes could each select a full matrix A and communicate it to the other side. After this, the two matrices may be added modulo q. To avoid giving the last node to send the matrix an advantage, a commitment on the chosen matrix may first be send by said last node.

An interesting way to reduce the overhead of sending the full matrix A is to generate a random seed and sending the random seed through the communication channel to the other node. After receiving the seed, the first and second network node may use it to generate the matrix A in any of the above ways. The same random seed is used to seed a deterministic pseudo random number generator which in turn generates the matrix (A) from the output of the pseudo random number generator. As above, each node can send a seed, e.g., to generate different parts of A, or the two seeds may be combined, e.g., added, or XOR-ed etc., and the combined seed may be used to generate A.

The seeds may, e.g., be selected from a further random number generator, e.g., a true random number generator. The nodes may also be configured with a list of random numbers, e.g., at manufacture. In this case, the nodes select a next random number from the list each time a new matrix A is generated for a new key agreement. If the list of random number is exhausted, it may be replenished from a trusted source.

In an embodiment, matrix A is a square matrix with dimensions n by n. This is not strictly necessary, the dimensions of the other elements of the protocol could be adapted to take into account a non-square matrix A. Choosing a square matrix A is however most convenient and will be assumed throughout.

Initiator node 110 comprises a private key matrix unit 140. Responder node 210 comprises a private key matrix unit 240. Private key matrix unit 140 is configured to generate a private key matrix $S_I$; Private key matrix unit 240 is configured to generate a private key matrix $S_R$. The entries in the private key matrices are integer numbers bounded in absolute value by a bound s. For example, an entry in a private key matrix may be chosen between −s and s (bounds included).

The inventors found that, surprisingly, choosing the bound small has a dual advantage: matrix multiplications with the private key matrix are faster, and the distance between the raw keys computed at each side is smaller (see below). The latter means that less reconciliation data is needed and/or the chance of a failure in the protocol because the nodes agreed on a different key is smaller. The bound s is chosen at most the second modulus, e.g., less-than-or-equal to the second modulus. This choice is advantageous since later we multiply modulo p. We can restrict it to at most (or smaller than) half the second modulus (p/2) if we allow for signed entries in S.

The bound may be lower than the second modulus or half the second modulus, and in practice the bound will typically be chosen much smaller than that. In an embodiment, the bound s on the absolute value of entries in the private key matrix ($S_I$, $S_R$) is 2 (s=2). That is, all entries in a private key matrix are either −2, −1, 0, 1, or 2. To multiply matrix A with a private key matrix only additions, subtractions and shifts over 1 bit are needed. Such a matrix multiplication can thus be implemented very efficiently.

From an implementation perspective, best results are achieved by choosing the bound to be 1 (s=1). That is, the entries of a private key matrix are only the values −1, 0 and 1. We will refer to this also as 'signed binary'. Matrix multiplication with a matrix in signed binary only involves additions and subtractions. No multiplication unit for multiplication modulo p or q is needed.

Other small numbers for s are also possible, e.g., if s=3, the allowed entries are: 0,1, −1,2, −2,3, −3. Multiplication routines for multiplying with these numbers may be comprised in the nodes. For example, +1, −1 may be handled by an adder/subtractor, −2, +2 may be handled by a shift followed by an adder/subtractor, and +3, −3 may be handled by adding/subtracting both the shifted and non-shifted number.

In an embodiment, the private key matrix comprises only entries that are 0, powers of two and optionally minus powers of two as these are easy to multiply with.

In an embodiment, the private key matrix contains both positive and negative numbers. However, it is also possible further restrict the private key matrix to non-negative numbers. For example, the entries in the private key matrix may be between 0 and s (bounds included). For example, by choosing s=1, in the latter case avoids both multiplication and subtraction operations.

The dimensions of the private key matrices are chosen so that they can be multiplied with matrix A. For example, if A is n by n, then the private key matrix of the initiator node may be an n by n matrix; the private key matrix of the responder node may be an n by $\bar{m}$ matrix. The sizes of $\bar{n}$ and $\bar{m}$ are chosen large enough to obtain a sufficient number of bits in the shared key, and to obtain a sufficiently high security level.

In addition to restricting the size of the entries of the private key matrix further advantages are obtained by restricting the number of non-zero elements. We will refer to the hamming weight of a column or row of a matrix as its number of non-zero entries The inventors investigated different ways to restrict the hamming weight of private key matrices. It is generally sufficient to restrict hamming weight for either the columns or for the rows, depending on whether the private key matrix is left or right multiplied with matrix A. For example, if the private key matrix is right-multiplied with the matrix A (e.g., AS) it is sufficient to restrict hamming weight in columns of the private key matrix.

For example, an upper bound may be selected for the hamming weight of the columns and/or rows of a private key matrix. The upper bound may the same for all columns and/or rows. In an embodiment, the columns and/or rows of the private key matrix ($S_I$, $S_R$) have the same fixed hamming weight.

Security is improved if—subject to the conditions—a private key matrix is chosen uniformly random from the candidate private key matrices, that is from the matrices that satisfy the chosen requirements, e.g., as to the bounds on entries and the hamming weights in columns or rows. For example, if one desires to enforce the condition that the hamming weight of each column is 50, then it is advantageous to select a private key matrix from the set of all matrices with the correct dimensions that have hamming weight of 50 for each column. Efficient algorithms to select a uniformly random bit string of any desired hamming weight are known.

A different way to restrict the hamming weight of the private key matrices is to choose the columns and/or rows of a private key matrix ($S_I$, $S_R$) from a probability distribution. For example, entries in the private key matrix ($S_I$, $S_R$) may be chosen from a non-uniform probability distribution, wherein the probability of a zero entry is larger than the probability of a non-zero entry. In an embodiment, the probability distribution is chosen so that it gives a predetermined expected hamming weight for the columns and/or rows. For example, to choose a column of length n and expected hamming weight $h_s$ one may select each entry as non-zero with probability $h_s/n$. The non-zero entry may be chosen as 1 or −1, e.g., with equal probability.

A hamming weight in the columns or rows that is too small may impact the security. For example, for the signed binary case, one may chose the hamming weight $h_s$ such that $$\log_2 \binom{n}{h_s} + h_s$$

is at least 127, more preferably at least 255. The reason is to make brute-force attack by looping over private key matrices infeasible. In an embodiment, the hamming weight $h_s$ as small as possible to satisfy the above bound.

Initiator node 110 comprises a public key matrix unit 150. Responder node 210 comprises a public key matrix 250. The public key matrix unit computes a public key matrix from matrix A and a private key matrix S.

The terms public and private are intended to convey that the shared key cannot be obtained only with knowledge of public information, or not without knowledge of some private information. There is no requirement though that public information is actively shared. For example, the key agreement protocol could be executed over a (presumed) secure channel, which keeps the public keys secure from eavesdroppers. In this case the key agreement protocol provides an additional layer of security in case the security of the channel is breached.

The public key matrix unit computes a public key matrix P ($P_I$, $P_R$ for the initiator and the responder respectively) by computing a matrix product between the shared matrix (A) and the private key matrix ($S_I$, or $S_R$ respectively) modulo the first modulus (q) obtaining a matrix product and scaling the result down.

However, this intermediate matrix multiplication is not revealed. Knowledge of the shared matrix A and the result of this matrix multiplication would reveal the private key, as it may be computed by inverting the matrix A. The scaling step performed by the public key matrix unit blocks this option. The public key matrix unit scales the entries in the matrix product down to a second modulus p. The second modulus p is smaller than the first modulus q. A scaled entry is equal to the unscaled entry multiplied with the second modulus (p), divided by the first modulus (q) and rounded to the nearest integer. For example, if x is an unscaled entry modulo q in the matrix product, the scaled entry may be selected as $$\lfloor \frac{p}{q} x \rceil,$$

wherein $\lfloor \ \rceil$ represents the nearest integer. After the scaling operation, it is no longer straightforwardly possible to compute the private key from the public key and the matrix A.

Entries in a public key matrix may be represented as integers in the interval [0, p−1]. Entries in a private key matrix may also be represented as integers in the interval [0, p−1]. There is an advantage to choose the entries in the interval $$[-\frac{p}{2}, \frac{p}{2}]$$

to reduce the size of the integers for subsequent multiplications. As pointed out above the private key matrix may also have entries chosen in the interval [−s,s] or even [0,s].

The multiplication of matrix A and a private key matrix S is done modulo the first modulus q. For this end the network node may comprises a modular reduction unit for reducing modulo q. If the entries in the private key matrix S are small, e.g., bounded by 1, or bound by 1 in absolute value, the modular reduction may be simplified; during the matrix multiplication, each time an entry becomes larger than q or smaller than 0 the result is brought back to the interval 0 to q−1 by subtracting or adding q.

Both the initiator node and the responder node send their public key matrix to the other node, e.g., using the communication interfaces 120 and 220. The inventors found at least three advantages that are realized by scaling down the matrix product. First of all, generation and explicit addition of noise into the matrix product is avoided. Introducing noise requires the computation of a probability distribution, e.g., a Gaussian distribution. These are relatively computationally intensive. Second, communication requirements are reduced. Since second modulus p is smaller than the first modulus q, fewer bits are needed to represent an entry of the public key matrix than of a private key matrix. Third, computations that involve the public key matrix are smaller since they involve smaller numbers. It is surprising that a single measure simultaneously provides three advantages.

It is strongly preferred that the second modulus p divides the first modulus q. Interestingly, the inventors found that neither the first nor the second modulus needs to be a prime number. In fact, it was found that choosing the second modulus (p) and/or the first modulus (q) as a power of 2 has the advantage that the public and private keys are uniformly distributed. In an embodiment both the first and second modulus is a power of 2.

In an embodiment, we further require that $2^{B+b_h}|p$ in addition to moduli p and q that are powers of two. This causes uniform shared keys even if the reconciliation data is observed. B is the number of shared key bits extracted per entry of raw key.

The sizes of the moduli need not be very large. For example, in an embodiment the second modulus has as bit size of 12 or more, and/or the first modulus has as bit size of 8 or more. Larger or smaller sizes are possible depending on the security requirements. In an embodiment, q is in the range of 2^12 and 2^15, p is in the range 2^7 and 2^9 (inclusive). The values of p and q may be chosen larger or smaller as security demands dictate.

Initiator node 110 comprises a shared key unit 160. Responder node 210 comprises a shared key unit 260. The shared key units are different in the sense that they either generate and transmit, or receive and apply the reconciliation data.

Both shared key unit 160 and shared key unit 260 are configured to compute a raw key 162, 262 as a matrix product modulo the second modulus (p) between the received public key of the other node and the private key matrix of the network node itself. The dimensions of the matrices, and matrix multiplications are chosen such that if the scaling operation were omitted both parties would compute an identical raw key. That is, identical keys would result without scaling, and all computations were done modulo q. However, due to the scaling both raw keys need not be identical. Computing the raw key is done modulo p. The network nodes may comprise a modular unit for reducing the result of the multiplications modulo p.

Shared key unit 260 of responder node 210 is arranged to obtain the shared key 266 and reconciliation data 264 from the raw key 262, and to send the reconciliation data 264 to the initiator network node 110. Reconciliation data may take the form of one or more bits in the raw key. Bits chosen as reconciliation data are ignored for the purpose of generating a key.

Shared key unit 260 chooses some bits from the entries of the raw key to form a key from. For example, the chosen bits may be concatenated. In an embodiment, the chosen bits are input to a key derivation function (KDF), e.g., a cryptographic hash function. An example of a KDF is given in e.g., the CMLA_KDF from CMLA Technical Specification, Version: V1.43-20131218, or the KDF function defined in "DRM specification", OMA-TS-DRM-DRM-V2_0_2-20080723-A, Open Mobile Alliance™, Version 2.0.2, section 7.1.2, etc. The key derivation function may be applied to the entries of key bits in the raw key, e.g. obtained by the rounding function, e.g., after concatenation, or from the outputs from the reconciliation function, e.g., also after concatenation.

Some bits that are not chosen as key bits may be selected as reconciliation data. Finally, some bits may be discarded altogether. In an embodiment, key bits are selected from the MSB parts of the raw key entries, reconciliation data is selected from middle parts of the raw key entries, least significant parts of the raw key may be discarded. For example, the key bits may be obtained by applying the rounding function to the entries of the raw key; the reconciliation bits may be obtained by applying the cross-rounding function to the entries of the raw key.

The key reconciliation data obtained from the raw key by shared key unit 260 is sent to the initiator node 110.

Shared key unit 160 is configured to receive the reconciliation data 164(h) of the second network node, and to compute a shared key by applying a reconciliation function to the received reconciliation data and the raw key matrix 162. For example, the reconciliation function may be applied to each of the entries in the raw key 162 and corresponding part of reconciliation data. For example, if the reconciliation data 164 was part of the raw key generated by responder unit 210, the initiator node may select a raw key that could have been obtained by node 210 and is compatible with the received reconciliation data, e.g. has the same middle bits as received. One way of doing this is to use the reconciliation function defined above. As a result, the same bits are recovered that node 210 used to create the shared key. By concatenating the bits in the same way, or by inputting them to the same KDF the same shared key 166 is obtained. In an embodiment, the shared key is a symmetric key.

Not much reconciliation data is needed, only a single bit can be sufficient. However, it was observed that increasing the number of reconciliation bits to 2 bits or more is advantageous, since it reduces the failure probability of the protocol.

Typical values for B and $b_h$ are 1 or 2. Herein is B the number of key bits extracted per raw key entry, and $b_h$ the number of reconciliation bits per raw key entry. The size of the $\bar{n}$ and $\bar{m}$ are chosen such that $\bar{n}\bar{m}B$ is sufficiently large, e.g., $\bar{n}\bar{m}B \geq 256$. For example, $\bar{n}$ and $\bar{m}$ may be chosen about equal. To keep overhead small one may choose them as $\lceil \sqrt{256/B} \rceil$.

One could reuse one of the matrix A and the private key matrix for multiple executions of the key agreement protocol (if both are the same one would obtain the same shared key). This would reduce communication overhead, especially if matrix A is reused. However, the inventors realized that there is no need to reuse any of matrix A and private key matrix since no authentication is connected to these elements. In a preferred embodiment, a fresh matrix A and a fresh private key is obtained for each new key exchange. This has the advantage that attackers do not have the option to observer additional information by observing multiple executions of the protocol. Moreover, forward secrecy is improved.

After the protocol is completed and both nodes have computed a shared key, one of the nodes may send a key confirmation message to the other node to verify that they have agreed on the same key. For example, a key confirmation message may be a hash of the shared key, an encryption of a fixed value, an encryption of a random value together with the random value. Key confirmation may also be performed using a challenge response protocol. One may also choose to omit key confirmation. If the parties obtain a different shared key, then subsequent communication performed between them will fail. For example, the shared key may be used to encrypt and/or authenticate further communications, e.g., digital messages. If they arrived at a different shared key, then decryption and/or verification may fail.

Below further specific advantageous embodiments are described. The basic system representing this invention is a protocol, henceforth named the key-exchange (KEX) scheme, that can be carried out by two entities or parties, henceforth named Initiator and Responder in order to establish a shared secret between themselves that is known only to them. For this purpose, they use a number of common system parameters that they must agree on prior to carrying out the KEX scheme, some private information possessed by each of them, henceforth named their secret-keys and some public information possessed by each of them, henceforth named their public-keys. The security of the KEX scheme is based on the Learning with Rounding (LWR) problem whose security is based on the Learning with Errors (LWE) problem, protecting the secrecy of the shared secret and the secrecy of the Initiator's and Responder's secret-keys. In the examples below, the private key matrices are signed binary.

An embodiment of the KEX scheme comprises three phases:

1. Setup:
   Initiator and Responder agree on common values for the following system parameters which are positive integers:
   i. q: The modulus of the LWR problem.
   ii. n: The dimension of the LWR problem. It also represents the dimension of a matrix $A \in Z_q^{n \times m}$ that is a public parameter of the LWR problem.
   iii. $h_s$: The hamming weight of each string in a distribution of signed binary (i.e., ternary) strings, such that $h_s < n$.
   iv. $\bar{n}$: Number of LWR problem instances or samples created by the Initiator during the KEX protocol.
   v. $\bar{m}$ Number of LWR problem instances or samples created by the Responder during the KEX protocol.
   vi. B: Number of bits extracted per coefficient of the two parties' raw keys, while creating the final shared secret or key.
   vii. $b_h$: Number of bits extracted per coefficient of the two parties' raw keys, while creating the reconciliation data.
   viii. p: The rounding modulus of the LWR problem, an integer multiple of $2^{B+b_h+1}$ and satisfying $p|q$. Note that the requirement of p as a power of two allows for faster and more efficient implementations.

Moreover, the parties agree on the public matrix
   i. $A \in Z_q^{n \times m}$: A fresh instance of this matrix is chosen for each KEX session.

The selection of the common parameters can be integrated into a protocol such as TLS or IKE if the specific parameters are mapped to a given identifier. For example, a protocol identifier, e.g., in TLS the cipher suite element, may be used to encode the common parameters. The public matrix can also be derived from a seed, e.g., by means of a hash function. In a different solution, the initiator will decide some parameters that will be sent to the responder.

2. Key-Generation:
   Initiator creates a fresh secret-key $sk_I \in \{0, \pm 1\}^{n \times \bar{n}} \leftarrow HWT_n(h_s)^{\bar{n}}$, by sampling $\bar{n}$ times from the distribution $HWT_n(h_s)$, that represents the distribution of uniform vectors in $\{0, \pm 1\}^n$ that have a hamming weight of $h_s$.
   Initiator creates her public key $$pk_I = \left\lfloor \left(\frac{p}{q}\right) \cdot \{A \cdot sk_I (\bmod q)\} \right\rfloor \in Z_p^{n \times \bar{n}}.$$

Responder creates a fresh secret-key $sk_R \in \{0, \pm 1\}^{n \times \bar{m}} \leftarrow HWT_n(h_s)^{\bar{m}}$, by sampling $\bar{m}$ times from the distribution $HWT_n(h_s)$, that represents the distribution of uniform vectors in $\{0, \pm 1\}^n$ that have a hamming weight of $h_s$.

Responder creates her public key $$pk_R = \left\lfloor \left(\frac{p}{q}\right) \cdot \{sk_R^T \cdot A(\bmod q)\} \right\rfloor \in Z_p^{m \times n}.$$

3. Key-Exchange:

TABLE 1

Key-exchange between an initiator I and responder R utilizing rounding and sparse, secret matrices containing ternary entries, leading to the establishment of a shared secret K between I and R. The middle column gives an example of the messages that may be exchanged between the initiator and the responder

| KEX Initiator | KEX Responder |
|---|---|
| Agrees upon a fresh $A \in Z_q^{n \times n}$ with peer, chooses a fresh, secret $sk_I$, $\in$ | Agrees upon a fresh $A \in Z_q^{n \times n}$ with peer, chooses a fresh, secret $sk_R$ $\in$ |
| $\{0, \pm 1\}^{n \times \overline{n}} \leftarrow HWT_n(h_s)^{\overline{n}}$, $q$, $p \in Z$ | $\{0, \pm 1\}^{n \times \overline{m}} \leftarrow HWT_n(h_s)^{\overline{m}}$, $q$, $p \in Z$ |
| such that $p < q$ and $p|q$. | such that $p < q$ and $p|q$. |
| $pk_I = \left\lfloor \left(\frac{p}{q}\right) \cdot \{A \cdot sk_I(\bmod q)\} \right\rfloor \in Z_p^{n \times \overline{n}}.$ | $pk_R = \left\lfloor \left(\frac{p}{q}\right) \cdot \{sk_R^T \cdot A(\bmod q)\} \right\rfloor \in Z_p^{\overline{m} \times n}.$ |
| $\xrightarrow{pk_I}$ | |
| | $RawK_R = sk_R^T \cdot pk_I (\bmod p) \in Z_p^{\overline{m} \times \overline{n}}.$ |
| | $h = \langle RawK_R \rangle_{B, b_h} \in Z_{2^{b_h}}^{\overline{m} \times \overline{n}}.$ |
| | $\xleftarrow{pk_R, h}$ |
| $RawK_I = pk_R \cdot sk_I (\bmod p) \in Z_p^{\overline{m} \times \overline{n}}.$ | |
| $K = rec(RawK_I, h) = \lfloor k \rfloor_{B, b_h}$, where k is the closest element to $RawK_I$ such that $\lfloor k \rfloor_{B, b_h} = h$. | $K = \lfloor RawK_R \rfloor_{B, b_h}.$ |

The inventors found four requirements that may be imposed on the parameters to improve security. These include the following.

1. Minimum Key Length:

To ensure that the shared secret contains at least a targeted number of bits, the initiator's parameter $\overline{n}$, the responder's parameter $\overline{m}$ and the system parameter B should be such that, $$\overline{n} \cdot \overline{m} \cdot B \geq \text{Desired length of shared secret in bits.}$$

2. Security Against Exhaustive Search Attack of Secret-Key:

We assume a targeted security-level in bits of s (post-quantum) and 2S (classical). In order to ensure that an exhaustive, brute-force search of the secret-key in order to estimate its entries has a high enough workload, the number of secrets in the secret-key vectors (each having a hamming weight $h_s$) should satisfy:

$$\binom{n}{h_s} \cdot 2^{h_s} > 2^{2S}$$

where, $2^{2S}$ is the running time of Grover's quantum-search algorithm and $2^S$ is the running time of a classical search algorithm. For example, S may be 128 or 256 etc. Note that this bound is for the case where the bound on the absolute values of entries in the private key matrices is 1. Similar bound may be established for larger bounds s.

3. Success Probability:

To ensure that the probability that the initiator and the responder do not arrive at the same final shared secret is at most $p_{fail}$, the values for the parameters $\overline{n}$, $\overline{m}$, $h_s$ and the constant should be chosen such that, $$2e^{2h_s}\left(\frac{1}{2} - \xi\right)^{2h_s} \cdot \overline{n} \cdot \overline{m} \leq p_{fail}$$

where $\xi = \frac{p(1 - 2^{-b_h})}{2^{B+2} \cdot h_s}$.

4. Security Analysis:

To ensure that the time complexity of the BKZ lattice reduction algorithm is at least $2^{128}$, guaranteeing 128-bit post-quantum security, the LWR dimension n must be greater than the following lower bound expressed in terms of the BKZ Root-Hermite factor $\delta$ (a parameter of the BKZ algorithm), rounding modulus p and the sparseness degree $\theta = h_s/n$:

$$n \geq \frac{\left\{\log_2 p + 0.5 \log_2\left(\frac{6}{\pi}\right)\right\}^2}{4 \log_2 \delta \cdot (\log_2 p + 0.5 \log_2(12 \cdot \theta))}$$

The BKZ Root-Hermite factor $\delta$ is an indication of the accuracy of the BKZ algorithm. For example, for classical security on may assume δ=1.003922, with BKZ blocksize=409, for post-quantum crypto one may assume δ=1.00367, with BKZ blocksize=450, and for increased security in post-quantum crypto one may assume δ=1.00309, with BKZ blocksize=573.

Selection of the private key matrices may be done probabilistically. Probabilistic secret key-generation simplifies implementation. While creating the secret-key $sk_I \in \{0,\pm 1\}^{n \times \bar{n}} \leftarrow HWT_n(h_s)^{\bar{n}}$ and $sk_R \in \{0,\pm 1\}^{n \times \bar{m}} \leftarrow HWT_n(h_s)^{\bar{m}}$, instead of generating $h_s$ non-zero entries per column of the secret-keys, each $(i,j)^{th}$ secret-key entry $sk^{(i,j)}$ in this embodiment would be created as follows:

$$sk^{(i,j)} = 1, \text{ with probability} = \left(\frac{h_s}{2n}\right),$$

$$sk^{(i,j)} = -1, \text{ with probability} = \left(\frac{h_s}{2n}\right),$$

$$sk^{(i,j)} = 0, \text{ with probability} = \left(1 - \frac{h_s}{n}\right).$$

Alternatively, if the generation is deterministic, then the following may be done using a standard secure PRF: if there are $h_s$ non-zero elements (either 1 or −1) in a vector of n positions, then the output the PRF selects random positions in the column along with random +1 or −1 values until the PRF selected $h_s$ non-zero elements at different locations. For example, the PRF output may be divided into blocks of ⌈log n⌉+1 bits in which the first ⌈log n⌉ bits of the block identify the position of the non-zero element and the last bit of the block determines if the element is 1 or −1.

The proposed key-exchange has several advantages.

Computational Complexity:

As the secret-key matrix is sparse and has entries, 0, 1, and −1, computations modulo q in our scheme are fast. Specifically, multiplications involving matrices of high dimension (for example during the generation of public-keys and raw keys) can be highly optimized. We quantify the computational performance of our proposed key-exchange scheme in the following table, providing CPU clock cycles required for the phases of the key-exchange scheme, when run on an Intel Xeon Quad-core 3.2 GHz processor:

TABLE 2

Computational performance of the proposed scheme, showing CPU clock cycles required for key-generation and total key-exchange, for three security levels. Number of final key-bits chosen, i.e., B, is shown in Column 6.

| Case | q | p | n | $h_s$ | Keylength = $\bar{n} \cdot \bar{m} \cdot B$ | $b_h$ | Initiator Key-Generation (SK + PK) | Responder Key-Generation (SK + PK) | Total Key-Exchange |
|---|---|---|---|---|---|---|---|---|---|
| I | 2048 | 256 | 380 | 49 | 8 · 8 · 2 = 128 bits | 2 | 32329015 CPU clock cycles | 29923102 CPU clock cycles | 62672479 CPU clock cycles |
| II | 4096 | 1024 | 510 | 46 | 8 · 8 · 4 = 256 bits | 2 | 37517641 CPU clock cycles | 32664199 CPU clock cycles | 70736287 CPU clock cycles |
| III | 4096 | 1024 | 610 | 43 | 8 · 8 · 4 = 256 bits | 2 | 42209327 CPU clock cycles | 34880341 CPU clock cycles | 77752022 CPU clock cycles |

Case I may be chosen for medium security, e.g., for classic security. Cases II and II may be chosen for post-quantum security. Case III is more secure than case II.

Communication Complexity:

Due to the use of rounding to a lower modulus, we are able to reduce the size of each entry of a public-key and raw key, achieving significantly lower bandwidth requirements. We quantify this in the two following tables, where we demonstrate the bandwidth requirements of our proposed scheme (with and without the use of rounding, respectively). Embodiments are compared to the LWE based protocol described in "Frodo: Take off the ring! Practical, Quantum-Secure Key Exchange from LWE", by J. Bos, C. Costello, L. Ducas, I. Mironov, M. Naehrig, V. Nikolaenko, A. Raghunathan, D. Stebila.

The bandwidth is calculated as the total size of key-exchange messages exchanged (i.e., public-keys and reconciliation data) and does not include the exchange of the public matrix A.

TABLE 3

Communication performance of the proposed scheme, showing improvements in bandwidth requirements over a state of the art LWE-based key-exchange scheme, Frodo. (Number of final key-bits B = 2, number of reconciliation data bits $b_h$ = 2)

| Scheme | n | $\log_2 q$ | $\log_2 p$ | Keylength = $\bar{n} \cdot \bar{m} \cdot B$ | Bandwidth (Proposal using LWR) | Bandwidth (Frodo LWE) | Ratio |
|---|---|---|---|---|---|---|---|
| I | 380 | 11 | 8 | 8 · 8 · 2 = 128 bits | 6.1 KB | 14.22 KB | 0.43 |
| II | 510 | 12 | 10 | 8 · 8 · 4 = 256 bits | 10.22 KB | 22.57 KB | 0.45 |
| III | 610 | 12 | 10 | 8 · 8 · 4 = 256 bits | 12.22 KB | 25.93 KB | 0.47 |

Bandwidth Gain Using LWE and Sparse, Small Secrets:

TABLE 4

Communication performance of the proposed scheme when only sparse, small secrets are used, instead of in combination with rounding. (Number of final key-bits B = 2, number of reconciliation data bits $b_h$ = 2)

| Scheme | n | $\log_2 q$ | Keylength = $\bar{n} \cdot \bar{m} \cdot B$ | Bandwidth (Proposal using LWE) | Bandwidth (Frodo LWE) | Ratio |
|---|---|---|---|---|---|---|
| I | 540 | 12 | 8 · 8 · 2 = 128 bits | 12.98 KB | 14.22 KB | 0.91 |
| II | 715 | 15 | 8 · 8 · 4 = 256 bits | 21.47 KB | 22.57 KB | 0.95 |
| III | 855 | 15 | 8 · 8 · 4 = 256 bits | 25.67 KB | 25.93 KB | 0.99 |

The bandwidth gains for the first table—sparse-LWR (rounding used in combination with sparse, small secrets) are more desirable than for the second table—sparse-LWE (only sparse, small secrets used) due to the following reasons: The minimum value of the LWR and LWE problem dimension n is higher in the case of sparse-LWE compared to n's minimum value in the case of sparse-LWR. This is because this minimum value is determined by the variance of the Gaussian error distribution in sparse-LWE, which imposes a stricter minimum bound on n than in the case of sparse-LWR (where n's minimum bound is controlled by the ratio $$\frac{p}{q}).$$

The bandwidth in sparse-LWR is controlled by $\log_2 p$, which is smaller than $\log_2 q$ (in the case of sparse-LWE).

In the various embodiments, the communication interface may be selected from various alternatives. For example, communication interface may be a network interface to a local or wide area network, e.g., the Internet, a storage interface to an internal or external data storage, a keyboard, etc.

The network nodes may comprise an electronic storage, e.g., to store intermediate data such as the matrix A, the public and private key matrices, and the shared key, etc. The storage may be implemented as an electronic memory, say a flash memory, or magnetic memory, say hard disk or the like. The storage may comprise multiple discrete memories together making up storage. The storage may also be a temporary memory, say a RAM. In the case of a temporary storage, the storage may use some means to obtain common parameters before use e.g. by obtaining them over an optional network connection (not separately shown).

Typically, the devices 110 and 210 each comprise a microprocessor (not separately shown in FIG. 1) which executes appropriate software stored at the devices 110 and 210; for example, that software may have been downloaded and/or stored in a corresponding memory, e.g., a volatile memory such as RAM or a non-volatile memory such as Flash (not separately shown). Alternatively, the devices 110 and 210 may, in whole or in part, be implemented in programmable logic, e.g., as field-programmable gate array (FPGA). Devices 110 and 210 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, a network node comprises a communication interface circuit, a shared matrix circuit, a private key matrix circuit, a public key matrix circuit, and a shared key circuit. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only. The circuits may also be, FPGA, ASIC or the like.

Figure 3:
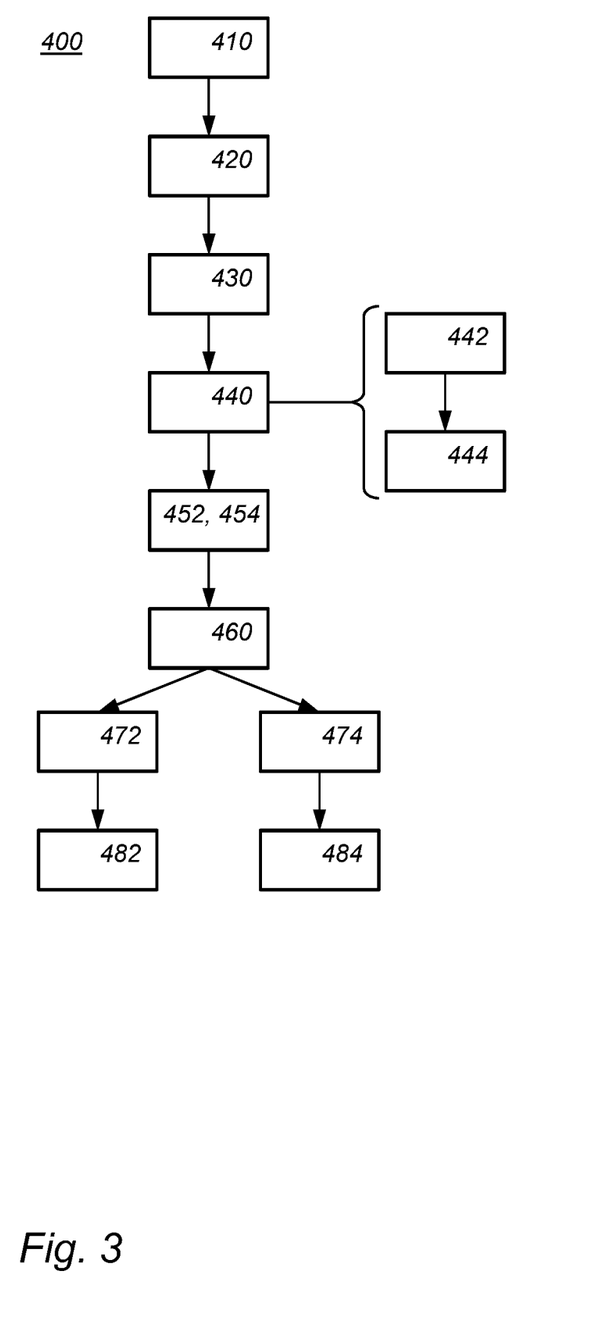

FIG. 3 schematically shows an example of an embodiment of an electronic key exchange method. The method may be executed by a first electronic network node, such as initiator node 110 or responder node 210.

Method 400 comprises
- arranging (410) digital communication between the first network node and a second network node,
- obtaining (420) a shared matrix (A), the shared matrix being shared with the second network node through the digital communication, entries in the shared matrix A being selected modulo a first modulus q,
- generating (430) a private key matrix ($S_I$), entries in the private key matrix being bounded in absolute value by a bound (s),
- generating (440) a public key matrix ($P_I$) by
  - computing (442) a matrix product between the shared matrix (A) and the private key matrix ($S_I$) modulo the first modulus (q) obtaining a matrix product
  - scaling (444) the entries in the matrix product down to a second modulus (p), a scaled entry being equal to the unscaled entry multiplied with the second modulus (p), divided by the first modulus (q) and rounded to the nearest integer, the second modulus (p) being smaller than the first modulus (q), the bound (s) being at most the second modulus (p),
- sending (452) the public key matrix of the first network node to the second network node,
- receiving (454) a public key matrix ($P_R$) of the second network node,
- computing (460) a raw key as a matrix product between the received public key of the second node and the private key matrix of the first network node modulo the second modulus (p), If the first network node is operating according to an initiator mode, then the first network node performs the following further elements.
- receiving (472) reconciliation data (h) of the second network node,
- computing (482) a shared key by applying a reconciliation function (rec) to the received reconciliation data and the raw key.

If the first network node is operating according to a responder mode, then the first network node performs the following further elements.
- obtaining (474) the shared key and reconciliation data from the raw key,
- sending (484) the reconciliation data to the first network node.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, a given step may not have finished completely before a next step is started.

A method according to the invention may be executed using software, which comprises instructions for causing a processor system to perform method 400. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 4A:
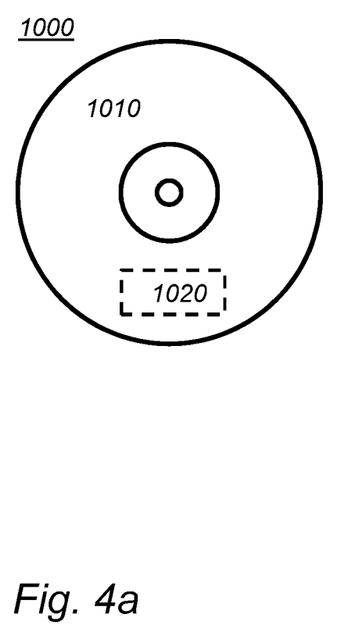

FIG. 4a shows a computer readable medium 1000 having a writable part 1010 comprising a computer program 1020, the computer program 1020 comprising instructions for causing a processor system to perform a key agreement method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said key agreement method 400.

Figure 4B:
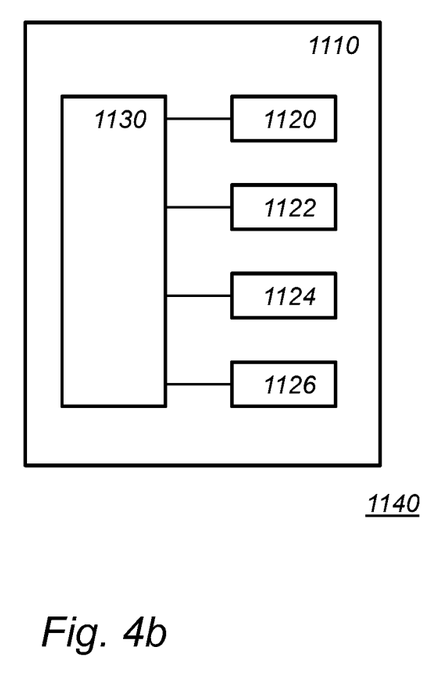

FIG. 4b shows in a schematic representation of a processor system 1140 according to an embodiment. The processor system comprises one or more integrated circuits 1110. The architecture of the one or more integrated circuits 1110 is schematically shown in FIG. 4b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, a network node may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the verification device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A first electronic network node configured for a key exchange protocol, the first network node comprising:
    a communication interface circuit, wherein the computer interface circuit is arranged for digital communication with a second network node; and
    a processor circuit,
    wherein the processor circuit is arranged to
    obtain a shared matrix,
        wherein the shared matrix is shared with the second network node through the communication interface circuit,
        wherein entries in the shared matrix are selected modulo a first modulus,
    wherein the processor circuit is arranged to generate a private key matrix,
        wherein entries in the private key matrix are bounded in absolute value by a bound,
    wherein the processor circuit is arranged to generate a public key matrix, wherein the generation of the public key matrix comprises:
        computing a matrix product between the shared matrix and the private key matrix modulo the first modulus to obtain a matrix product;
        scaling the entries in the matrix product down to a second modulus,
            wherein a scaled entry is equal to the unscaled entry multiplied with the second modulus, divided by the first modulus and rounded to the nearest integer,
            wherein the second modulus is smaller than the first modulus,
            wherein the bound is at most the second modulus;
        sending the public key matrix of the first network node to the second network node;
        receiving a public key matrix of the second network node; and
        computing a raw key as a matrix product between the received public key of the second node and the private key matrix of the first network node modulo the second modulus,
    wherein the processor circuit is arranged to receive reconciliation data from the second network node,
    wherein the processor circuit is arranged to compute a shared key by applying a reconciliation function to the received reconciliation data and the raw key.

2. The first network node as in claim 1, wherein the bound in absolute value of entries in the private key matrix is 2.

3. The first network node as in claim 2, wherein $\log_2(h_s^{\bar{n}})+h_s$ is at least 127, wherein n is a dimension of the matrix and $h_s$ is the hamming weight.

4. The first network node as in claim 1, wherein columns and/or rows of the private key matrix have a fixed hamming weight.

5. The first network node as in claim 1, wherein the private key matrix is chosen randomly from candidate private key matrices.

6. The first network node as in claim 1,
    wherein entries in the private key matrix are chosen from a non-uniform probability distribution,
    wherein the probability of a zero entry is larger than the probability of a non-zero entry.

7. The first network node as claim 6,
    wherein the private key matrix is chosen from a probability distribution,
    wherein the probability distribution has a fixed expected hamming weight for the columns and/or rows of the private key matrix.

8. The first network node as in claim 1, wherein the second modulus divides the first modulus.

9. The first network node as in claim 1, wherein the second modulus and/or the first modulus is a power of 2.

10. The first network node as in claim 1, wherein the processor circuit is arranged to obtain a fresh matrix and/or a fresh private key for each new key exchange.

11. The first network node as in claim 1, wherein the size of the reconciliation data is 2 bits or more.

12. The first network node as in claim 1,
    wherein the processor circuit is arranged to obtain a shared matrix by generating a random seed and sending the random seed through the communication channel to the second network node,
    wherein the first network node and the second network node the random seed to seed a deterministic pseudo random number generator,
    wherein the processor circuit is arranged to generate the matrix from output of the deterministic pseudo random number generator.

13. The first network node as in claim 1,
    wherein the matrix has at least one dimension equal to n,
    wherein the private key of the first node has dimensions n and $\bar{n}$,
    wherein the private key of the second node has dimensions $\bar{m}$ and n, wherein $\bar{n}$ and $\bar{m}$ are smaller than n.

14. The first network node as in claim 1, wherein the first modulus has as bit size of at least 12, and/or the second modulus has as bit size of at least 7.

15. The first network node as in claim 1, wherein the bound is 1.

16. An electronic key exchange method for a first electronic network node, the method comprising
    arranging digital communication between the first network node and a second network node;
    obtaining a shared matrix,
    wherein the shared matrix is shared with the second network node through the digital communication,
    wherein entries in the shared matrix are selected modulo a first modulus;

generating a private key matrix, wherein entries in the private key matrix are bounded in absolute value by a bound; and generating a public key matrix, wherein in the generating comprises:

computing a matrix product between the shared matrix and the private key matrix modulo the first modulus to obtain a matrix product;

scaling the entries in the matrix product down to a second modulus, wherein a scaled entry is equal to the unscaled entry multiplied with the second modulus, divided by the first modulus and rounded to the nearest integer, wherein the second modulus is smaller than the first modulus, wherein the bound is at most the second modulus;

sending the public key matrix of the first network node to the second network node;

receiving a public key matrix of the second network node; and computing a raw key as a matrix product between the received public key of the second node and the private key matrix of the first network node modulo the second modulus;

receiving reconciliation data of the second network node; and computing a shared key by applying a reconciliation function to the received reconciliation data and the raw key.

17. A computer program stored on a non-transitory medium, wherein the computer program when executed on a processor performs the method as claimed in claim 16.

18. An electronic key exchange method for a first electronic network node, the method comprising arranging digital communication between the first network node and a second network node;

obtaining a shared matrix, wherein the shared matrix is shared with the second network node through the digital communication, wherein entries in the shared matrix are selected modulo a first modulus;

generating a private key matrix, wherein entries in the private key matrix are bounded in absolute value by a bound; and generating a public key matrix, wherein in the generating comprises:

computing a matrix product between the shared matrix and the private key matrix modulo the first modulus to obtain a matrix product;

scaling the entries in the matrix product down to a second modulus, wherein a scaled entry is equal to the unscaled entry multiplied with the second modulus, divided by the first modulus and rounded to the nearest integer, wherein the second modulus is smaller than the first modulus, wherein the bound is at most the second modulus;

sending the public key matrix of the first network node to the second network node;

receiving a public key matrix of the second network node; and computing a raw key as a matrix product between the received public key of the second node and the private key matrix of the first network node modulo the second modulus;

receiving reconciliation data of the second network node;

obtaining the shared key and reconciliation data from the raw key; and sending the reconciliation data to the second network node.

19. A computer program stored on a non-transitory medium, wherein the computer program when executed on a processor performs the method as claimed in claim 18.

20. A first electronic network node configured for a key exchange protocol, the first network node comprising:

a communication interface circuit, wherein the computer interface circuit is arranged for digital communication with a second network node; and a processor circuit, wherein the processor circuit is arranged to obtain a shared matrix, wherein the shared matrix is shared with the second network node through the communication interface circuit, wherein entries in the shared matrix are selected modulo a first modulus, wherein the processor circuit is arranged to generate a private key matrix, wherein entries in the private key matrix are bounded in absolute value by a bound, wherein the processor circuit is arranged to generate a public key matrix, wherein the generation of the public key matrix comprises:

computing a matrix product between the shared matrix and the private key matrix modulo the first modulus to obtain a matrix product;

scaling the entries in the matrix product down to a second modulus, wherein a scaled entry is equal to the unscaled entry multiplied with the second modulus, divided by the first modulus and rounded to the nearest integer, wherein the second modulus is smaller than the first modulus, wherein the bound is at most the second modulus;

sending the public key matrix of the first network node to the second network node;

receiving a public key matrix of the second network node; and computing a raw key as a matrix product between the received public key of the second node and the private key matrix of the first network node modulo the second modulus, wherein the processor circuit is arranged to receive reconciliation data from the second network node, wherein the processor circuit is arranged to obtain the shared key and reconciliation data from the raw key, wherein the processor circuit is arranged to send the reconciliation data to the second network node.

21. The first network node as in claim 20, wherein the bound in absolute value of entries in the private key matrix is 2.

22. The first network node as in claim 20, wherein the bound is 1.

23. The first network node as in claim 22, wherein $$\log_2\binom{n}{h_s} + h_s$$

is at least 127, wherein n is a dimension of the matrix and $h_s$ is the hamming weight.

24. The first network node as in claim 20, wherein columns and/or rows of the private key matrix have a fixed hamming weight.

25. The first network node as in claim 20, wherein the private key matrix is chosen randomly from candidate private key matrices.

26. The first network node as in claim 20,
wherein entries in the private key matrix are chosen from a non-uniform probability distribution,
wherein the probability of a zero entry is larger than the probability of a non-zero entry.

27. The first network node as claim 26,
wherein the private key matrix is chosen from a probability distribution,
wherein the probability distribution has a fixed expected hamming weight for the columns and/or rows of the private key matrix.

28. The first network node as in claim 20, wherein the second modulus divides the first modulus.

29. The first network node as in claim 20, wherein the second modulus and/or the first modulus is a power of 2.

30. The first network node as in claim 20, wherein the processor circuit is arranged to obtain a fresh matrix and/or a fresh private key for each new key exchange.

31. The first network node as in claim 20, wherein the size of the reconciliation data is 2 bits or more.

32. The first network node as in claim 20,
wherein the processor circuit is arranged to obtain a shared matrix by generating a random seed and sending the random seed through the communication channel to the second network node,
wherein the first network node and the second network node the random seed to seed a deterministic pseudo random number generator,
wherein the processor circuit is arranged to generate the matrix from output of the deterministic pseudo random number generator.

33. The first network node as in claim 20,
wherein the matrix has at least one dimension equal to n,
wherein the private key of the first node has dimensions n and $\bar{n}$,
wherein the private key of the second node has dimensions $\bar{m}$ and n, wherein $\bar{n}$ and $\bar{m}$ are smaller than n.

34. The first network node as in claim 20, wherein the first modulus has as bit size of at least 12, and/or the second modulus has as bit size of at least 7.

* * * * *